United States Patent [19]

Runkle

[11] 4,384,637

[45] May 24, 1983

[54] BAND BRAKE ASSEMBLY

[75] Inventor: Dean E. Runkle, La Porte, Ind.

[73] Assignee: The Bendix Corporation, Southfield, Mich.

[21] Appl. No.: 235,246

[22] Filed: Feb. 17, 1981

[51] Int. Cl.³ .............................................. F16D 49/00
[52] U.S. Cl. .................................... 188/77 R; 74/516; 74/522; 188/140 A; 192/80
[58] Field of Search .............. 188/75, 76, 77 R, 77 W, 188/342, 140 A, 250 R, 249, 250 H, 259, 72.2, 72.8, 72.9, 72.7, 204 A, 70 B; 74/516, 522; 192/80, 81 R, 81 C

[56] References Cited

U.S. PATENT DOCUMENTS

| 1,837,573 | 12/1931 | Mox | 188/342 X |
| 2,955,680 | 10/1960 | Caero | 188/70 B |
| 4,053,032 | 10/1977 | McDonald | 188/77 R |
| 4,197,927 | 4/1980 | Johannesen et al. | 188/77 R |
| 4,217,974 | 8/1980 | Holcomb, Jr. | 188/77 R |

FOREIGN PATENT DOCUMENTS

| 703765 | 2/1941 | Fed. Rep. of Germany .... | 188/77 R |
| 899063 | 10/1943 | France . | |

Primary Examiner—Douglas C. Butler
Attorney, Agent, or Firm—Paul David Schoenle; Ken C. Decker

[57] ABSTRACT

A band brake assembly comprises a friction element (12) engageable with a rotatable member (10) and an input linkage assembly (30) controlling engagement of the friction element with the rotatable member. The input linkage assembly (30) is carried by a mounting bracket (32) and includes a first lever (34), a bearing assembly (38) and a second lever (40) engageable with an end plate (42) secured to the ends of the friction element (12). The end plate (42) carries pins (22, 24) secured to the friction element and extending into slots (52, 54) on the mounting bracket (32). The pins transfer braking torque to the mounting bracket (32) and are guided by the slots to provide a servo assist during braking.

5 Claims, 4 Drawing Figures

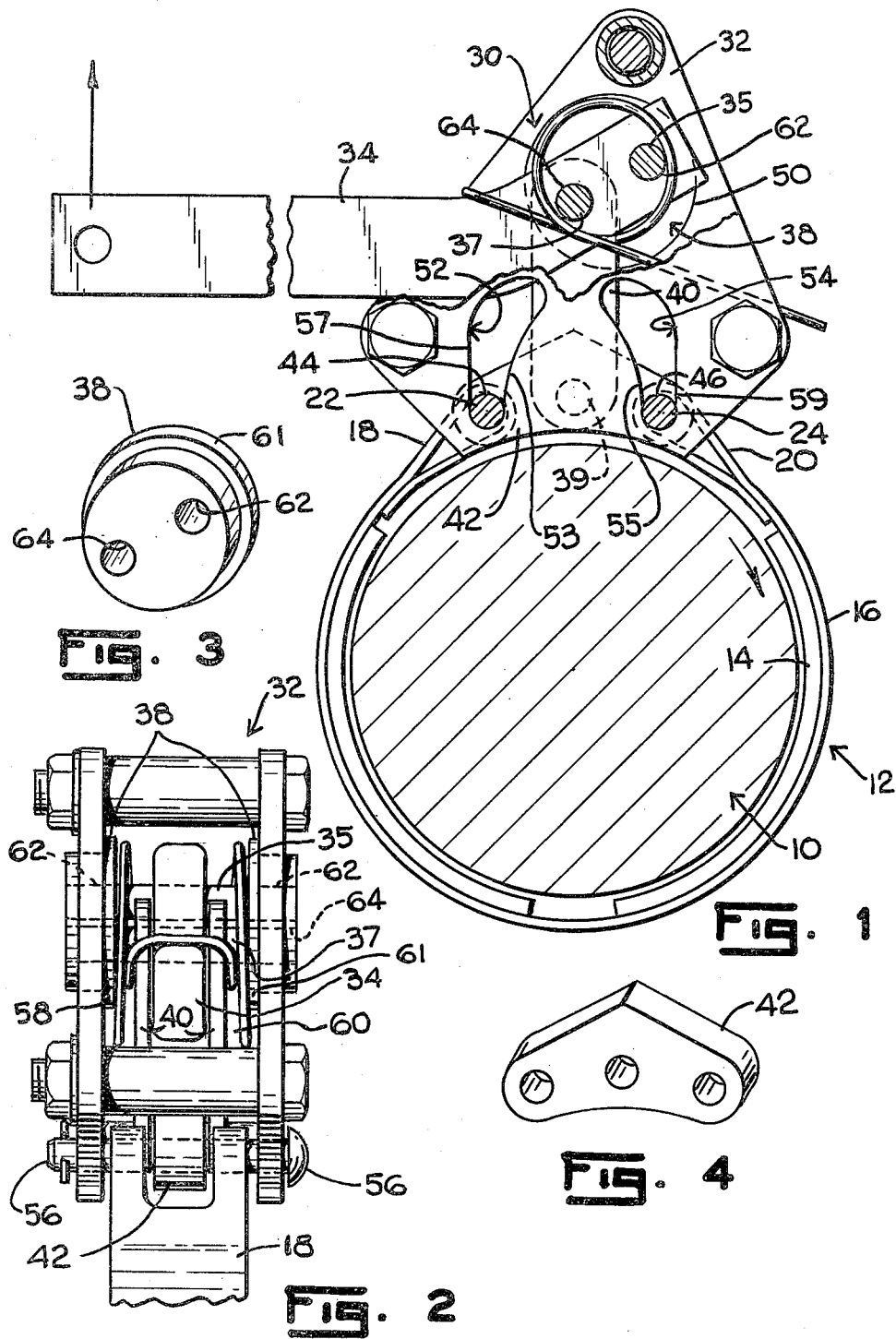

BAND BRAKE ASSEMBLY

This invention relates to a band brake assembly wherein a friction element surrounds a member to be braked and the friction element is contracted to engage the element with the member during braking.

In order to contract the friction element into engagement with the rotatable member, an input lever is pivoted and a linkage assembly between the input lever and the friction element is actuated to tighten the latter into engagement with the rotatable member. The friction element terminates in a pair of pins which connect with the linkage assembly so that the linkage assembly imparts movement to the pins and friction element upon actuation of the input lever.

The prior art is illustrated in U.S. Pat. No. 2,955,680.

With the rotatable member having two directions of rotation, the bank brake assembly must operate for both directions of rotation for the rotatable member. Also, when the rotatable member is associated with a large mass, such as a car or truck, the bank brake assembly must develop sufficient braking torque to prevent movement of the large mass, while at the same time remain simple and reliable.

The present invention provides a band brake assembly for a rotatable member, a friction element surrounding the rotatable member and engageable therewith to substantially prevent rotation of the rotatable member, a mounting bracket fixedly disposed adjacent the rotatable member and adapted to absorb torque developed when the friction element is engaging the rotatable member, and an input linkage assembly cooperating with the mounting bracket and the friction element to move the latter into frictional engagement with the rotatable member, the input linkage assembly comprising a first lever pivotally anchored to said mounting bracket, and a second lever connecting with said friction element and said first lever, characterized by said friction element including a pair of projections adjacent said second lever, said mounting bracket including a pair of slots having a predetermined configuration, said projections extending into said slots, said slots cooperating with said projections to control the engagement of said friction element with said rotatable member at the location of said second lever.

The advantage offered by the invention is a simple band brake assembly which requires little input travel to obtain a servo action for the friction element.

One way of carrying out the invention is described in detail below with reference to the accompanying drawings, in which:

FIG. 1 is a side view of a band brake assembly constructed in accordance with the present invention and illustrated in the rest position;

FIG. 2 is a left side view of FIG. 1;

FIG. 3 is a perspective view of a part of the bearing assembly in FIG. 1; and

FIG. 4 is a perspective view of the end plate shown in FIG. 1.

A rotatable member 10 is surrounded by a friction element 12. The rotatable member 10 is connected to a wheel of a motor vehicle such as illustrated in copending application Ser. No. 239,298, filed 3-2-81 therefore. The friction element 12 includes a substantially flexible friction lining 14 and band 16. The band 16 terminates in ends 18 and 20 which connect with pins 22 and 24, respectively.

In order to engage the friction element with the rotatable member, an input linkage assembly 30 is carried by a mounting bracket 32 and the input linkage assembly 30 is engageable with the ends 18 and 20 of the band 16 via the pins 22 and 24. The input linkage assembly 30 comprises a first lever 34 coupled to a cable to control movement of the first lever relative to the mounting bracket 32, a bearing assembly 38 rotatably carried by the mounting bracket 32 and engaging the first lever 34 via pin 35, and a second lever 40 extending from the first lever 34 via pin 37 to an end plate 42 via pin 39. The end plate is provided with openings 44 and 46 for receiving the pins 22 and 24, respectively. The end plate is substantially rigid so that it maintains an invariant spacing between the pins 22 and 24.

The mounting bracket 32 is fixedly secured to a portion of a motor vehicle (not shown) and defines openings 50 for rotatably carrying the bearing assembly 38. In addition, the mounting bracket defines a pair of slots 52 and 54 for receiving projections 56, the projections being integrally formed at the end of the pair of pins 22 and 24. The pair of slots 52 and 54 converge towards each other as they extend away from the rotatable member 10. The inner surfaces 53 and 55 uniformly converge in an arcuate manner; whereas, the outer surface 57 and 59 define first portions which are parallel and second portions which uniformly converge in an arcuate manner. As shown in FIG. 2, the mounting bracket is bifurcated with a central space 60 for receiving the input linkage assembly 30 and the ends 18 and 20 of friction element 12. Also, the first lever 34 is a singular member; whereas, the second lever 40 is formed by a pair of members.

Viewing FIG. 2, the bearing assembly 38 comprises a pair of annular discs carried in openings 50. The discs are provided with flanges 58 and 61 abutting the mounting bracket 32 and pins 35 and 37 extend into respective openings 62 and 64 provided on both discs. Therefore, the first lever 34 rotates through the same angle as the bearing assembly 38.

With the rotatable member 10 rotating in the clockwise direction indicated in FIG. 1, actuation of the input linkage assembly 30 causes the first lever to pivot clockwise about the mounting bracket 32. At the same time, the bearing assembly 38 rotates clockwise within openings 50, so that the pin 35 moves toward the rotatable member and the pin 37 moves away from the rotatable member. The second lever 40 moves with the pin 37 away from the rotatable member to move the end plate 42 and the pin 22 and 24 away from the rotatable member. As the pins 22 and 24 move through the first portions of slots 52 and 54, the friction element 12, which is attached to the pins, is taking up any slack or clearance with the rotatable member. Once the slack is taken up, the rotatable member engages the friction element to bias the end 20 to move the pin 24 within slot 54 to a position adjacent the rotatable member. This results from the end 20 of the friction element being pulled by the rotatable member to rotate therewith. The end 18 of the friction element is pushed clockwise to bias the pin 22 to move away from the rotatable member within slot 52. Consequently, the end plate is pivoting clockwise about pin 39, which, in turn, is moved with the second lever 40. By pushing pin 22 away from the rotatable member along surface 53, the friction element is performing a servo action to bias the pin 24 towards the rotatable member, thereby increasing the frictional engagement between the end 20 and the rotatable member. Torque developed in braking clockwise movement of the rotatable member is absorbed by the mounting bracket via the engagement between pin 24 and the wall of slot 54.

If the rotatable member 10 is rotating counterclockwise, viewing FIG. 1, the torque developed is absorbed by the mounting bracket via the engagement between pin 22 and the wall of slot 52. Also with counterclockwise rotation, the pin 24 is pushed away from the rotatable member along surface 55.

I claim:

1. In a band brake assembly for a rotatable member, a friction element surrounding the rotatable member and engageable therewith to substantially prevent rotation of the rotatable member, a mounting bracket fixedly disposed adjacent the rotatable member and adapted to absorb torque developed when the friction element is engaging the rotatable member, and an input linkage assembly cooperating with the mounting bracket and the friction element to move the latter into frictional engagement with the rotatable member, the input linkage comprising a first lever pivotally anchored to said mounting bracket, and a second lever connecting with said friction element and said first lever, characterized by said friction element including a pair of projections adjacent said second lever, said mounting bracket including a pair of slots having a predetermined configuration, said projections extending into said slots, said slots cooperating with said projections to control the engagement of said friction element with said rotatable member at the location of said second lever, said input assembly including a bearing, said mounting bracket defining an opening for rotatably receiving said bearing, and said bearing including a first pivot connecting with said first lever and a second pivot connecting with said second lever.

2. The band brake assembly of claim 1 characterized by said friction element including an end plate carrying said pair of projections to define an invariant spacing between said pair of projections.

3. The band brake assembly of claim 1 characterized by said predetermined configuration providing for one of said pair of projections to increase the engagement between said friction element and said rotatable member adjacent said one projection when said rotatable member is biased to rotate in one direction.

4. The band brake assembly of claim 3 characterized by said predetermined configuration providing for the other of said pair of projections to increase the engagement between said friction element and said rotatable member adjacent said other projection when said rotatable member is biased to rotate in an opposite direction to said one direction.

5. A band brake assembly comprising, in combination, a rotatable member to be braked, a mounting bracket fixedly disposed adjacent said rotatable member, a substantially annular friction element terminating in ends to maintain an invariant spacing therebetween, and an input linkage assembly pivotally coupled to said mounting bracket and engageable with said plate to move the latter relative to said rotatable member during a brake application, said plate carrying a pair of projections and said mounting bracket defining a pair of slots having a predetermined configuration for receiving said pair of projections, said slots cooperating with said pair of projections to substantially increase the engagement between one end of said friction element and said rotatable member, said input linkage assembly comprising a first lever pivotable relative to said mounting bracket, a second lever connecting said first lever with said plate, and a bearing rotatably carried by said mounting bracket, said bearing providing a first pivot for said first lever and a second pivot for said second lever, said first pivot being spaced from said second pivot.

* * * * *